United States Patent
Chankaya et al.

(10) Patent No.: US 10,228,451 B2
(45) Date of Patent: Mar. 12, 2019

(54) AIRCRAFT LASER DETECTOR

(71) Applicant: Lockheed Martin Corporation, Bethesda, MD (US)

(72) Inventors: Kurt M. Chankaya, Keller, TX (US); Mike Ivor Jones, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 294 days.

(21) Appl. No.: 15/151,045

(22) Filed: May 10, 2016

(65) Prior Publication Data

US 2017/0328986 A1 Nov. 16, 2017

(51) Int. Cl.
| | |
|---|---|
| *G01S 7/48* | (2006.01) |
| *G01S 19/13* | (2010.01) |
| *G01S 7/481* | (2006.01) |
| *G01S 5/16* | (2006.01) |
| G01S 3/782 | (2006.01) |

(52) U.S. Cl.
CPC .............. *G01S 7/4804* (2013.01); *G01S 5/16* (2013.01); *G01S 7/4813* (2013.01); *G01S 19/13* (2013.01); *G01S 3/782* (2013.01)

(58) Field of Classification Search
CPC . G06T 7/73; G06T 2207/10032; G01C 11/00; G06K 9/0063; Y02D 70/00; H04B 7/18506; H04B 7/18523
See application file for complete search history.

(56) References Cited

U.S. PATENT DOCUMENTS

| | | | |
|---|---|---|---|
| H979 | H | 11/1991 | Kelley |
| 6,296,036 | B1 | 10/2001 | Otto et al. |
| 7,196,301 | B2 | 3/2007 | Thomas et al. |
| 7,344,260 | B2 | 3/2008 | Derenski |
| 7,355,161 | B2 | 4/2008 | Romig et al. |
| 7,427,732 | B2 | 9/2008 | Thomas et al. |
| 7,893,890 | B2 | 2/2011 | Kelly et al. |
| 9,134,174 | B2 | 9/2015 | Jungwirth |
| 2014/0192367 | A1* | 7/2014 | Jungwirth ............... G01S 7/495 356/614 |

* cited by examiner

*Primary Examiner* — Luke D Ratcliffe
(74) *Attorney, Agent, or Firm* — Baker Botts L.L.P.

(57) ABSTRACT

In certain embodiments, an apparatus comprises a laser detector, a lens, a Global Positioning System ("GPS") receiver, a digital ground map, a tilt measurement device, and one or more processors. The laser detector is operable to detect a laser light emitted from a laser source, the lens is operable to pass the laser light to the laser detector, the GPS receiver is operable to determine a GPS location of an aircraft, and the tilt measurement device is operable to determine a tilt angle of the aircraft. The one or more processors of the apparatus are operable to determine a line of sight based on the detected laser light, the GPS location, and the tilt angle. The one or more processors are further operable to determine a location of the laser source from an intersection of the line of sight and the digital ground map.

18 Claims, 5 Drawing Sheets

AIRCRAFT LASER DETECTOR

TECHNICAL FIELD

The present disclosure relates in general to laser detection and more specifically to an aircraft laser detector.

BACKGROUND

With the rise in the number and power of lasers available on the market, airplanes are increasingly subject to laser flashes from the ground that threaten pilot vision. Thousands of laser flash incidents are reported each year in the United States. A laser light directed at an airplane can permanently damage a pilot's eyesight. Laser flashes may also distract or temporarily blind the pilot, potentially leading to an airplane crash.

SUMMARY OF THE DISCLOSURE

In accordance with the present disclosure, disadvantages and problems associated with laser detection may be reduced or eliminated.

In one embodiment, an apparatus includes a laser detector, a lens, a Global Positioning System ("GPS") receiver, a digital ground map, a tilt measurement device, and one or more processors. The laser detector is operable to detect a laser light emitted from a laser source, the lens is operable to pass the laser light to the laser detector, the Global Positioning System ("GPS") receiver is operable to determine a GPS location of an aircraft, and the tilt measurement device is operable to determine a tilt angle of the aircraft. The one or more processors of the apparatus are operable to determine a line of sight based on the detected laser light, the tilt angle, and the GPS location. The one or more processors are further operable to determine a location of the laser source from an intersection of the line of sight and the digital ground map.

In some embodiments, a system includes an apparatus, wherein the apparatus comprises a laser detector, a lens, and one or more processors. The laser detector is operable to detect a laser light emitted from a laser source and the lens is operable to pass the laser light to the laser detector. The one or more processors of the system are operable to access a digital ground map, a GPS location of an aircraft from a GPS receiver, and a tilt angle of the aircraft from a tilt measurement device. The one or more processors are also operable to determine a line of sight based on the laser light, the GPS location, and the tilt angle. The one or more processors are further operable to determine a location of the laser source from an intersection of the line of sight and the digital ground map.

In an embodiment, a method includes passing, by a lens coupled to an aircraft, a laser light emitted from a laser source to a laser detector and detecting, by the laser detector, the laser light emitted from the laser source. The method also includes accessing, by the one or more processors, a digital ground map, a GPS location of the aircraft from a GPS receiver, and a tilt angle of the aircraft from a tilt measurement device. The method further includes determining, by one or more processors, a line of sight based on the detected laser light, the GPS location, and the tilt angle, and determining, by the one or more processors, a location of the laser source from an intersection of the line of sight and the digital ground map.

Technical advantages of some embodiments of the disclosure may include determining a location of a laser source directed at an aircraft, which allows law enforcement officials to locate the person responsible for shining the laser at the aircraft. Further, the aircraft laser detector may determine exact ground coordinates in real time and communicate the determined ground coordinates in real time to law enforcement, allowing law enforcement officials to locate the user of the laser before the user relocates. This may deter users of lasers from future attacks on aircraft. As another example, some embodiments may record the location of the laser, the wavelength of the laser, and/or time of the laser light detection, which may provide evidence that can be used in a court of law to prosecute the user of the laser source.

Another technical advantage is the relatively small size of some embodiments of the aircraft laser detector, which may ease transportation and installation of the laser detector and cause little to no distraction to the pilots. As another advantage, some embodiments may be coupled directly to the inside window of the cockpit, which allows for easy installation.

Further, a technical advantage of some, embodiments includes the efficiency of utilizing an aircraft's aviation system for the GPS receiver and the tilt measurement device, which may reduce production costs. In still another embodiment, a technical advantage includes a stand-alone, self-powered aircraft laser detector that requires no electrical integration into the aircraft, which eliminates radio emissions and requires no use of power or data from the aircraft. Other technical advantages will be readily apparent to one skilled in the art from the following figures, descriptions, and claims. Moreover, while specific advantages have been enumerated above, various embodiments' may include all, some, or none of the enumerated advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 5, where like numbers are used to indicate like and corresponding parts.

Each year in the United States, thousands of laser incidents involving aircraft are reported. Laser illumination of an aircraft from the ground is a federal crime. However, most laser incidents cannot be prosecuted because the perpetrator's location is unknown.

To reduce or eliminate these and other problems, some embodiments of the present disclosure utilize an aircraft laser detector to determine a ground location of a perpetrator. In some embodiments, the ground location is immediately sent to law enforcement, enabling law enforcement officials to locate the perpetrator. Additionally, the aircraft laser detector may record information relating to the laser device, such as ground coordinates, a wavelength of the incoming laser light, or a time the aircraft laser detector detected the incoming laser light. This information may provide evidence that can be used to prosecute and convict the perpetrator.

Other technical advantages will be readily apparent to one skilled in the art from the following figures, descriptions, and claims. Moreover, while specific advantages have been enumerated above, various embodiments may include all, some, or none of the enumerated advantages. FIGS. 1-5 provide additional details relating to an aircraft laser detector.

Figure 1:
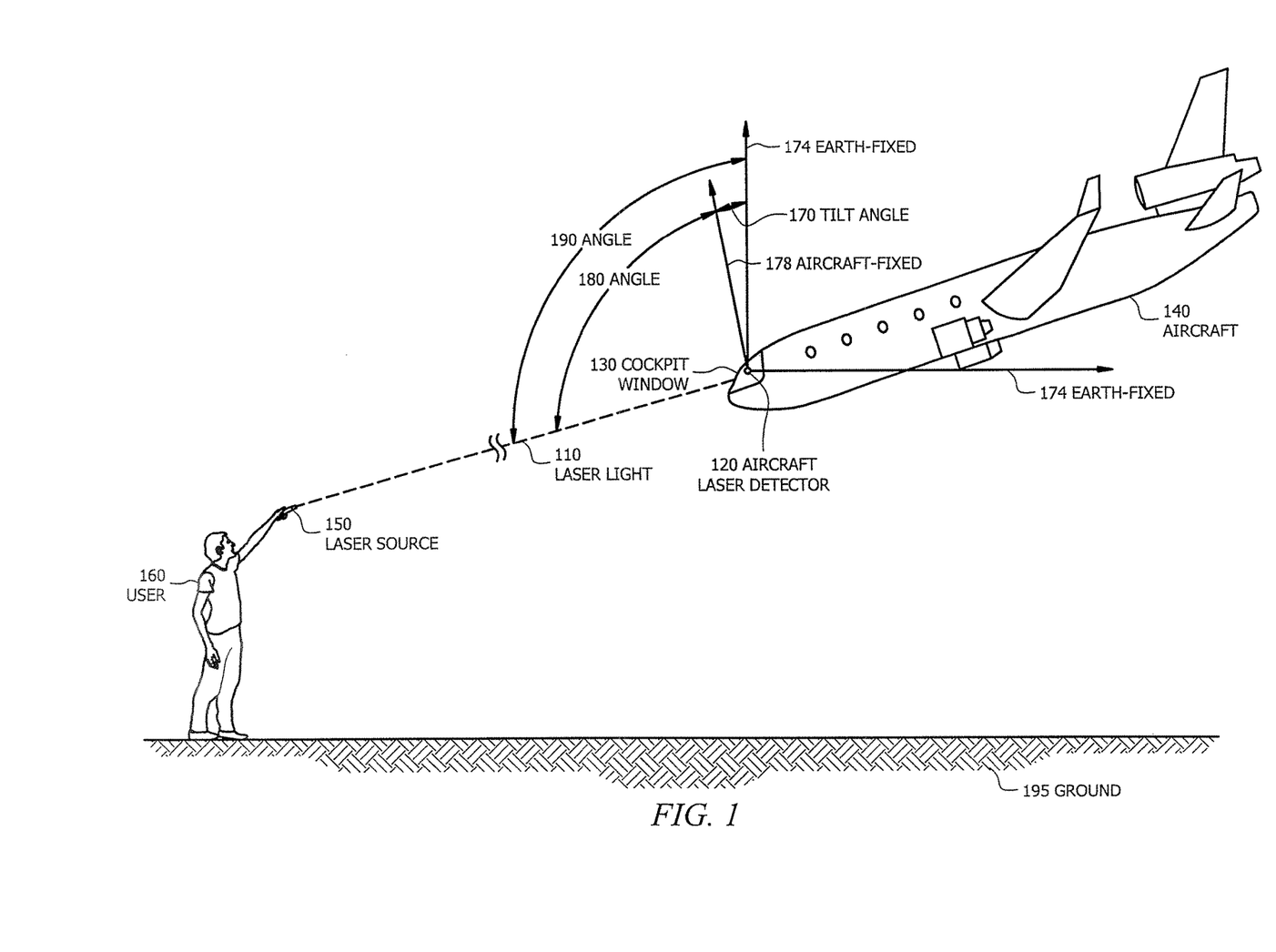
FIG. 1 illustrates a laser light emitted from a laser source and detected by an aircraft laser detector, according to certain embodiments.

FIG. 1 illustrates a laser light 110 detected by an aircraft laser detector 120, according to certain embodiments. As shown in the embodiment of FIG. 1, aircraft laser detector 120 is located on the inside of a cockpit window 130 of an aircraft 140. Aircraft laser detector 120 may be located near or on any surface of aircraft 140 that allows passage of laser light 110 to aircraft laser detector 120. For example, aircraft laser detector 120 may be located near or on a transparent surface of aircraft 140. As another example, aircraft laser detector 120 may be located near or on a translucent surface of aircraft 140. In some embodiments, aircraft laser detector 120 is located outside the cockpit area of aircraft 140. For example, aircraft laser detector 120 may be located on a window of the main cabin of aircraft 140.

In general, aircraft laser detector 120 detects incoming laser light 110 from a laser source 150. Laser source 150 may be any device that emits laser light 110. As an example, laser source 150 may be a hand-held laser pointer that is the size of a flashlight. As another example, laser source 150 may be a pen laser pointer that is the size of a pen. Aircraft laser detector 120 detects incoming laser light 110, determines a location of laser source 150, and in some embodiments, notifies authorities of the determined location.

In some embodiments, aircraft 140 may utilize more than one aircraft laser detector 120. For example, a first aircraft laser detector 120 may be located on a left-side of a cockpit window 130, a second aircraft laser detector 120 may be located on a right-side of another cockpit window 130, a third aircraft laser detector 120 may be located on a left-side of the cockpit windshield, and a fourth aircraft laser detector 120 may be located on a right-side of the cockpit windshield. As another example, a first aircraft laser detector 120 may be located on cockpit window 130 and a second aircraft laser detector 120 may be located on a main cabin window of aircraft 140. While aircraft 140 is depicted in FIG. 1 as an airplane, aircraft 140 may be any machine capable of flight, such as a helicopter or a glider. In some embodiments, aircraft 140 is a commercial airliner or a private aircraft, such as a private jet.

In the illustrated embodiment of FIG. 1, laser source 150 is any laser source that is powerful enough to generate laser light 110 that illuminates aircraft 140. As an example, laser source 150 may emit 1 watt of energy (i.e., a 1 watt laser source). In some embodiments, laser device 150 may emit less than 1 watt of energy (e.g., a 1 milliwatt laser source or a 10 milliwatt laser source). Additionally, laser source 150 may emit more than 1 watt of energy (e.g., a 2 watt laser source). In the illustrated embodiment, laser source 150 is operated by a user 160. User 160 may be any object or being capable of operating laser source 150. For example, user 160 may be a person. In some embodiments, laser source 150 may be self-operating, such as a laser scanner.

Laser light 110 emitted by laser source 150 may appear as any color. For example, laser source 150 may be a green laser pointer that emits a green laser light 110. In some embodiments, laser source 150 may emit a red, blue, or violet light. For example, aircraft laser detector 120 may detect a red laser light. Aircraft laser detector 120 is described in more detail below in reference to FIGS. 2 through 4.

Figure 2:
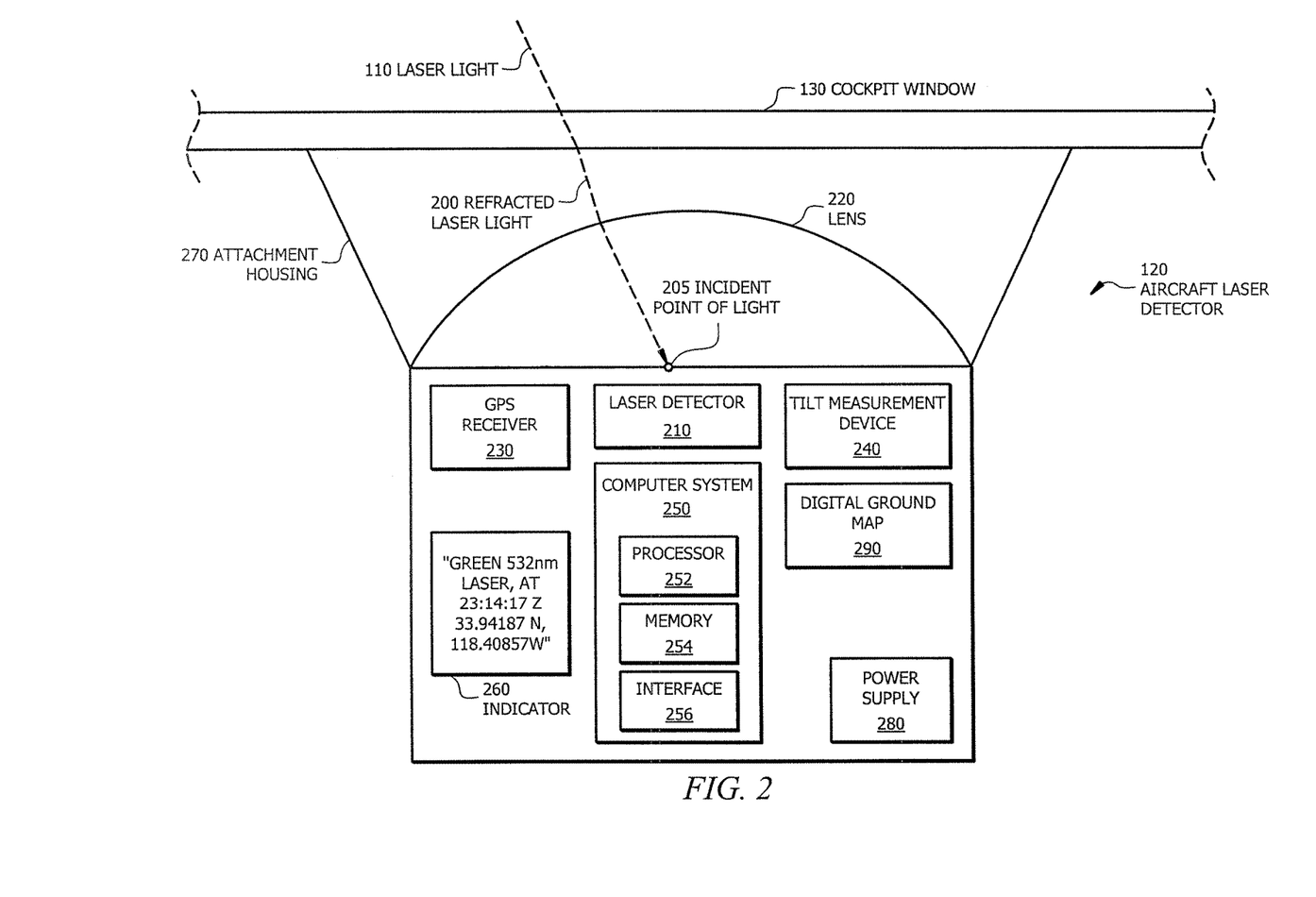
FIG. 2 illustrates a stand-alone, self-powered aircraft laser detector, according to certain embodiments.

FIG. 2 illustrates a stand-alone, self-powered embodiment of aircraft laser detector 120, according to certain embodiments. As a stand-alone, self-powered apparatus, aircraft laser detector 120 requires no electrical integration into aircraft 140. Systems of aircraft 140 do not provide power or data to aircraft laser detector 120. As depicted in FIG. 2, aircraft laser detector 120 includes its own source of power (e.g., power supply 280). Aircraft laser detector 120 may be any size. For example, aircraft laser detector 120 may be less than four cubic inches in volume. In the illustrated embodiment of FIG. 2, aircraft laser detector 120 includes a laser detector 210, a lens 220, a GPS receiver 230, a tilt measurement device 240, a computer system 250, an indicator 260, an attachment housing 270, and a power supply 280.

Laser detector 210 of aircraft laser detector 120 is any laser detector that can detect incoming laser light (e.g., laser light 110). For example, laser detector 210 may detect an incoming continuous wave green laser light emitted from laser source 150. As another example, laser detector 210 may detect an incoming pulsed wave green laser light emitted from laser source 150. In some embodiments, laser detector 210 is a photodetector. In certain embodiments, laser detector 210 may be a laser sensor such as a complementary metal oxide semiconductor, a charge-coupled device, a position-sensitive detector, or a photoelectric sensor. Laser detector 210 may operate simultaneously with one or more components of aircraft laser detector 120, such as tilt measurement device 240.

Lens 220 is any lens that passes laser light 110 to laser detector 210. Lens 220 may be a wide-angle lens or a narrow-angle lens having any angle of view that can pass laser light 110 to laser detector 210. In general, a wide-angle lens may be a lens with an angle of view greater than 50 degrees, while a narrow-angle lens may be a lens with an angle of view equal or less than 50 degrees. In some embodiments, lens 220 is a wide-angle lens with an angle of view of 90 degrees. In other embodiments, lens 220 is a narrow-angle lens with an angle of view of 50 degrees. As another example, lens 220 may be a narrow-angle lens with an angle of view of 30 degrees.

In certain embodiments, laser light 110 travels straight from laser source 150 to the outside surface of cockpit window 130. Laser light 110 may refract in a direction different from a direction of incoming laser light 110 as it passes through cockpit window 130 and lens 220 by a known amount that will be calibrated during design, fabrication, or installation of aircraft laser detector 120. As shown in FIG. 2, aircraft laser detector 120 detects incoming refracted laser light 200 at incident point of light 205. Refracted laser light 200 can be accounted for based on known properties of the design of lens 220 and the optical properties of the portion of cockpit window 130 on which aircraft laser detector 120 is mounted.

GPS receiver 230 is any device that determines a location of aircraft 140. For example, GPS receiver 230 may calculate a geographical location of aircraft 140 by receiving information from multiple satellites. In some embodiments, GPS receiver 230 may obtain three-dimensional or four-dimensional location data. In some embodiments, GPS receiver 230 determines a speed of aircraft 140, a distance to or from aircraft 140 to a checkpoint, and/or a time relative to the determination of the location of aircraft 140. GPS receiver 230 may operate simultaneously with one or more components of aircraft laser detector 120, such as laser detector 120.

Tilt measurement device 240 is any device that calculates a tilt angle (e.g., tilt angle 170) of aircraft 140. For example, tilt measurement device 240 may generate an artificial horizon and measure an angular tilt of aircraft 140 with respect to this horizon. In certain embodiments, tilt angle 170 represents an orientation of aircraft 140 to ground 195 or an Earth-fixed coordinate system 174. In the illustrated embodiment of FIG. 1, tilt angle 170 represents the angle between Earth-fixed coordinate system 174 and an aircraft-fixed coordinate system 178. In some embodiments, tilt measurement device 240 includes a tilt sensor.

In some embodiments, computer system 250 includes a processor 252, a memory 254, and an interface 256. In some embodiments, aircraft laser detector 120 includes more than one computer system 250. For example, laser detector 210 may include a first computer system 250, tilt measurement device 240 may include a second computer system 250, and indicator 260 may include a third computer system 250. In some embodiments, computer system 250 may include more or less components than those illustrated in FIG. 2. For example, computer system 250 may include a first processor 252, a second processor 252, an input/output (I/O) interface, and a communication interface. Certain embodiments of computer system 250 are described in more detail below in reference to FIG. 5.

In some embodiments, aircraft laser detector 120 determines a line of sight based on detected laser light 110, a location of aircraft 140 determined by GPS receiver 230, and a tilt angle (e.g., tilt angle 170) of aircraft 140 calculated by tilt measurement device 240. In certain embodiments, processor 252 may calculate one or more angles to determine the line of sight. For example, processor 252 may determine an angle 180 of laser light 110 relative to aircraft 140, as shown in FIG. 1. Angle 180 may be based on one or more calibrated properties of lens 220 and cockpit window 130 due to refracted laser light 200. Processor 252 may then determine an angle 190 of laser light 110 relative to Earth-fixed coordinate system 174 by combining angle 180 and tilt angle 170, as illustrated in FIG. 1. In certain embodiments, a three-dimensional method, such as quaternions, may be used to calculate a directional component of the line of sight. In some embodiments, the determined line of sight is a straight line from aircraft laser detector 120 to laser source 150 and/or ground 195.

In certain embodiments, aircraft laser detector 120 determines a wavelength of incoming laser light 110. For example, laser detector 210 may determine a wavelength ranging from 0.4 to 1.1 microns. Cockpit windows (e.g., cockpit window 130) may be transparent to wavelengths ranging from 0.4 to 1.1 microns. Further, wavelengths ranging from 0.4 to 1.1 microns may pose a risk of pilot eye damage and/or glare. Aircraft laser detector 120 may use the determined wavelength to determine a type of source emitting the laser light. As an example, laser detector 210 may determine that incoming laser light 110 has a wavelength of 0.532 microns, and based on this wavelength, aircraft laser detector 120 may determine that laser source 150 is a green laser pointer. Additionally, aircraft laser detector 120 may use the determined wavelength to determine the energy of laser source 150 (e.g., a 1 watt laser source).

Processor 252 is any processor (such as processor 502 described below) that performs one or more functions/steps of the disclosed embodiments. Memory 254 includes one or more devices for storing any information relating to aircraft laser detector 120. In some embodiments, memory 254 may store a line of sight, a GPS location, a tilt angle, a wavelength, and a time of detection. In certain embodiments, memory 254 may store a type of laser source 150, a time of detection of laser light 110, and a determined location of laser source 150. For example, memory 254 may store "Green 532 nm laser, at 23:14:17 Z, 33.94187 N, −118.40857 W" as the determined type of laser source 150, detection time, and laser source location. Memory 254 may include storage 506 as discussed in reference to FIG. 5 below.

Interface 256 enables communication between components (e.g., laser detector 210 and processor 250) of aircraft laser detector 120. In some embodiments, interface 256 enables communication between aircraft laser detector 120 and components external to aircraft laser detector 120. For example, interface 256 may facilitate communication between aircraft laser detector 120 and law enforcement, such as communicating exact ground coordinates of a laser source to law enforcement officials. As another example, interface 256 may facilitate communication between aircraft laser detector 120 and a recording device that records information relating to incoming laser light 110, such as exact coordinates of laser device 150, a color of laser light 110, a wavelength of laser light 110, and/or an exact time of laser detection by aircraft laser detector 120. In some embodiments, interface 256 communicates information relating to incoming laser light 110 in real time. Interface 256 may include communication interface 510 as discussed in reference to FIG. 5 below.

Indicator 260 is any device for visually or audibly communicating information. For example, indicator 260 may be a visual indicator located on aircraft laser detector 120 that includes a light-emitting diode ("LED") light for visually alerting pilots of incoming laser light 110. In some embodiments, indicator 260 may include a display that relays information relating to incoming laser light 110 to persons aboard the aircraft. As an example, the relayed information may include ground coordinates of laser source 150 or a wavelength of incoming laser light 110. In certain embodiments, an LED light of indicator 260 is an infrared LED light that can communicate information wirelessly. For example, an infrared LED light may transmit information to an infrared photo sensor at a control tower.

In certain embodiments, indicator 260 may be a verbal indicator to verbally alert persons aboard aircraft 140 of incoming laser light 110. For example, indicator 260 may include a speaker for sounding an alarm when incoming laser light 110 is detected. As another example, indicator 260 may verbally communicate information relating to a location of laser source 150, such as the ground coordinates of laser source 150.

Attachment housing 270 is any housing for coupling aircraft laser detector 120 to a surface. For example, attachment housing 270 may attach aircraft laser detector 120 to an interior window of a cockpit (e.g., cockpit window 130). Attachment housing 270 may be made of any material suitable for coupling aircraft laser detector 120 to any surface (e.g., plastic, glass, metal, and the like). In some embodiments, attachment housing 270 is glued or attached via an adhesive to a surface.

Power supply 280 is any power supply that provides power to aircraft laser detector 120. In some embodiments, power supply 280 includes one or more batteries suitable to operate aircraft laser detector 120. In certain embodiments, aircraft laser detector 120 is powered by a standard aircraft avionics power bus or other internal aircraft power system. Digital ground map 290 is any ground map that depicts geography (e.g., local geography). In certain embodiments, digital ground map 290 is an onboard digital terrain map stored in memory 254.

While the embodiment shown in FIG. 2 illustrates aircraft laser detector 120 having laser detector 210, lens 220, GPS receiver 230, tilt measurement device 240, computer system 250, indicator 260, attachment housing 270, and power supply 280, other embodiments of aircraft laser detector 120 may have more or less components than those illustrated in FIG. 2. For example, some embodiments of aircraft laser detector 120 may include an attitude indicator that indicates the orientation of aircraft 140 relative to the Earth's horizon. As another example, some embodiments of aircraft laser detector 120 may include a photodetector separate from laser detector 210 for detecting and/or measuring the intensity of radiant energy. In certain embodiments, aircraft laser detector 120 includes a recorder for recording information processed or accessed by aircraft laser detector 120.

In some embodiments, aircraft laser detector 120 determines a location of laser source 150 using the determined line of sight and digital ground map 290. For example, aircraft laser detector 120 may determine where the line of sight intersects digital ground map 290. This intersection may be represented by ground coordinates (e.g., "33.94187 N, −118.40857 W") of digital ground map 290, wherein the ground coordinates may be used to locate laser source 150.

In some embodiments, aircraft laser detector 120 determines a time when laser detector 210 detects incoming laser light 110. For example, aircraft laser detector 120 may determine that laser detector 210 detected incoming laser light 110 at 10:52 p.m. on Jan. 1, 2000. As another example, aircraft laser detector 210 may determine that laser detector 210 detected a continuous wave laser light 110 from 10:52:04 p.m. to 10:53:32 p.m. on Jan. 1, 2000. In some embodiments, aircraft laser detector 120 determines that laser detector 210 detected a pulsed wave laser light 110 from 10:52:04 p.m. to 10:53:32 p.m. on Jan. 1, 2000. Additionally, aircraft laser detector 120 may determine the time between pulses of a detected pulse wave laser light 110.

In operation of example embodiments, incoming laser light 110 passes through cockpit window 130 and lens 220 to laser detector 210 (e.g., photodetector) of aircraft laser detector 120. Processor 252 calculates angle 180 of laser light 110 relative to aircraft-fixed coordinate system 178. Angles of refracted laser light 200 may be accounted for based on known properties of lens 220 and cockpit window 130. Tilt measurement device 240 determines tilt angle 170 of aircraft 140 relative to Earth-fixed coordinate system 174. Processor 252 then calculates angle 190 of laser light 110 relative to Earth-fixed coordinate system 174 by combining tilt angle 170 and angle 180. Processor 252 determines a line of sight (e.g., a vector of a path of laser light 110) from aircraft 140 to ground 195 based on angle 190 and a location of aircraft 140 in three-dimensional space from GPS receiver 230. While this example illustrates a simplified two-dimensional method to calculate a direction of laser light 110, standard three-dimensional methods may be used to calculate the direction of laser light 110. For example, the three-dimensional method may use transformation matrices (e.g., quaternions) to calculate an orientation of laser light 110 in space.

Processor 252 may then determine a location of laser source 150 (e.g., 33.94187 N, 118.40857 W) from an intersection of the calculated line of sight and digital ground map 290. The location of laser source 150, combined with a timestamp (e.g., 23:14:17 Z) from an onboard aircraft system (e.g., aircraft avionic system 390) and a type of laser light 110 detected by laser detector 210 (e.g., Green 532 nm laser) is then communicated via interface 256 to ground, allowing for immediate and precise law enforcement response and credible evidence for prosecution.

Figure 3:
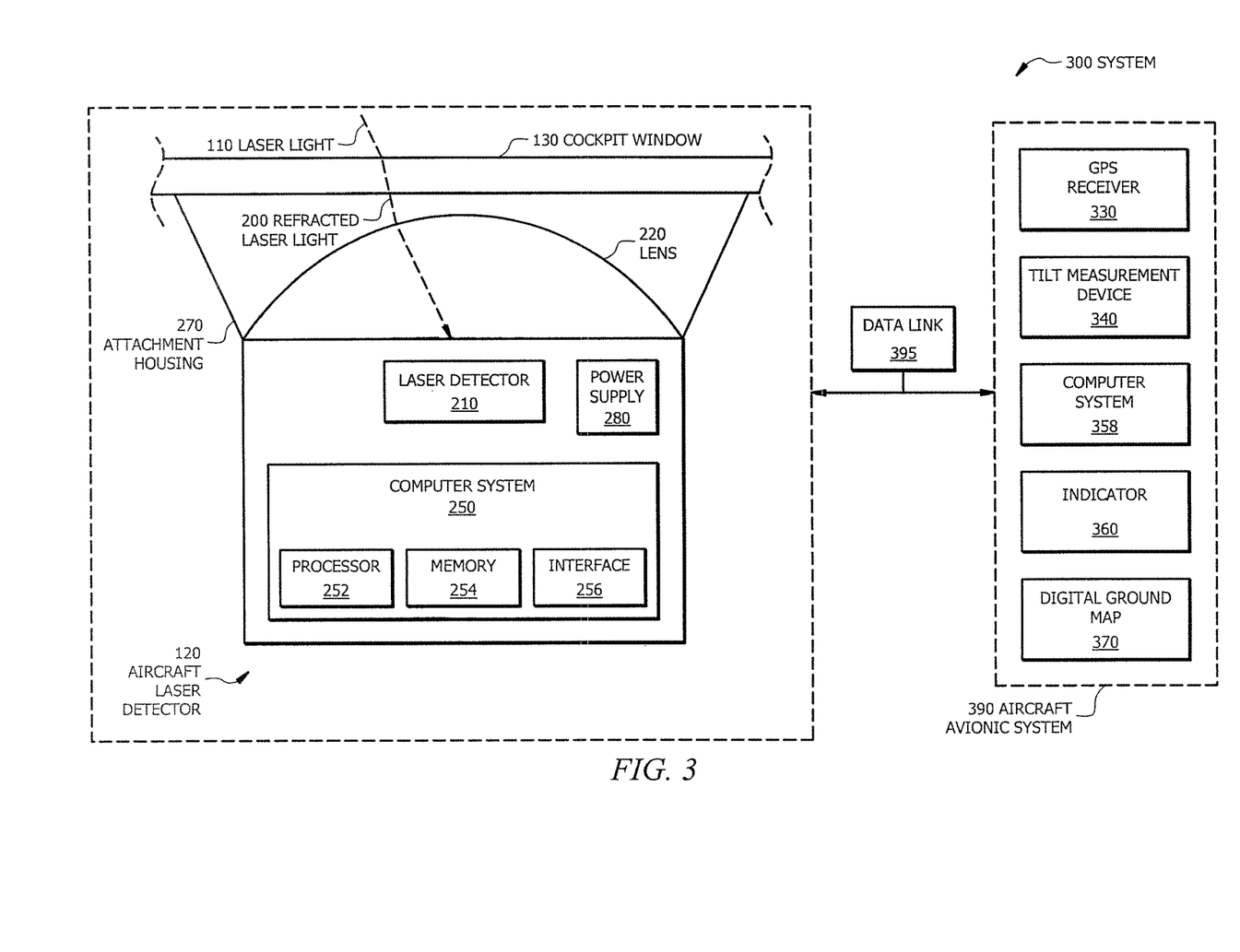
FIG. 3 illustrates a system that includes an aircraft laser detector, according to certain embodiments.

FIG. 3 illustrates a system 300 that includes aircraft laser detector 120, according to certain embodiments. System 300 includes, in addition to aircraft laser detector 120, an aircraft avionic system 390 and a data link 395.

Unlike the embodiment of FIG. 2, aircraft laser detector 120 of FIG. 3 is electrically integrated with sources external to aircraft laser detector 120. As shown, GPS receiver 330, tilt measurement device 340, computer system 358, indicator 360, and digital ground map 370 are external to aircraft laser detector 120, as opposed to being integrated with aircraft laser detector 120 as illustrated in FIG. 2. In the illustrated embodiment, GPS receiver 330, tilt measurement device 340, computer system 358, indicator 360, and digital ground map 370 are integrated into aircraft avionic system 390 of aircraft 140. In some embodiments, GPS receiver 330, tilt measurement device 340, computer system 358, indicator 360, and/or digital ground map 370 may be external to both aircraft laser detector 120 and aircraft avionic system 390. For example, computer system 358 may utilize a remote server external to aircraft avionic system 390 of aircraft 140 to store, process, or manage data. As another example, GPS receiver 330 may be included in an external hand-held device that can communicate with aircraft laser detector 120, such as a smartphone.

Data link 395 is any link for communicating data between aircraft laser detector 120 and components external to aircraft laser detector 120 (e.g., aircraft avionic system 390). Data link 395 may provide any electronic connection for the exchange of information. For example, aircraft laser detector 120 may utilize data link 395 to communicate data between interface 250 and an interface of computer system 358 within aircraft avionic system 390. Data link 395 may be any hard-wired or wireless connection.

While aircraft laser detector 120 of system 300 includes laser detector 210, lens 220, computer system 250, attachment housing 270, and power supply 280, aircraft laser detector 120 may include more or less features than those illustrated in FIG. 3. For example, aircraft laser detector 120 may include GPS receiver 330, while tilt measurement device 340 is integrated into aircraft avionic system 390. As another example, aircraft laser detector 120 may include tilt measurement device 340, while GPS receiver 330 is integrated into aircraft avionic system 390. In some embodiments, aircraft laser detector 120 may include indicator 360.

Figure 4:
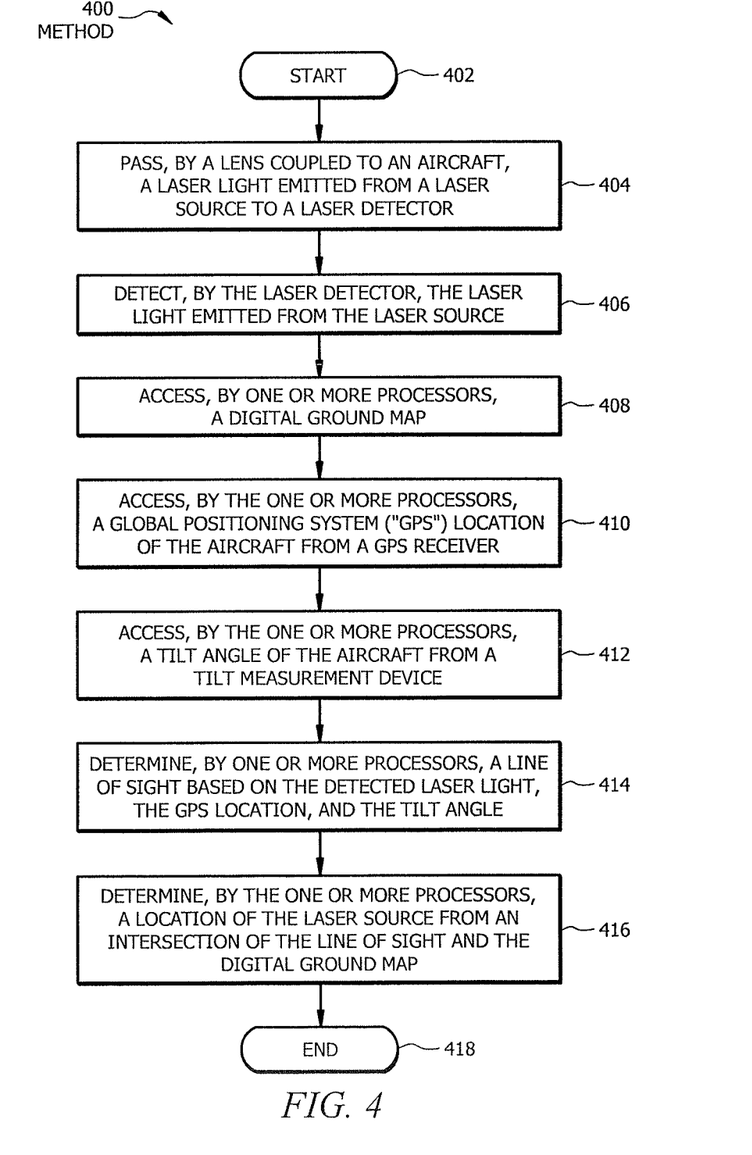
FIG. 4 illustrates a method for determining a location of a laser source, according to certain embodiments.

FIG. 4 illustrates a method 400 for determining a location of a laser source, according to certain embodiments. Method 400 may begin at step 402. At step 404, a lens coupled to an aircraft passes laser light emitted from a laser source to an aircraft laser detector. For example, lens 220 coupled to aircraft 140 may pass laser light 110 emitted from laser source 150 to laser detector 210. Method 400 may then proceed to step 406, where the laser detector detects the laser light emitted from the laser source.

At step 408, one or more processors access a digital ground map. Digital ground map (e.g., digital ground map 290 or digital ground map 370) may be accessed from the aircraft laser detector (e.g, aircraft laser detector 120) or from the aircraft's avionic system (e.g., aircraft avionic, system 390.) Method 400 may then proceed to step 410, where the one or more processors access a GPS location of the aircraft from a GPS receiver. In some embodiments, GPS receiver (e.g., GPS receiver 330) is integrated into the aircraft's avionic system (e.g., aircraft avionic system 390). As another example, one or more processors (e.g., processor 252) of an aircraft laser detector (e.g., aircraft laser detector 120) may access a GPS location from a GPS receiver (e.g., GPS receiver 230) of the aircraft laser detector apparatus.

At step 412 of method 400, the one or more processors access a tilt angle of the aircraft from a tilt measurement device. In some embodiments, tilt measurement device (e.g., tilt measurement device 340) is included in the aircraft's avionic system (e.g., aircraft avionic system 390). As another example, one or more processors (e.g., processor 252) of an aircraft laser detector apparatus (e.g., aircraft laser detector 120) may access a tilt angle from a tilt measurement device (e.g., tilt measurement device 240) of the aircraft laser detector apparatus.

Method 400 may then proceed to step 414, where the one or more processors (e.g., processor 252) determine a line of sight based on the detected laser light, the GPS location, and the tilt angle. In some embodiments, the one or more processors may determine a line of sight by accessing a pre-determined line of sight from another processor (e.g., a processor of computer system 358). Method 400 may then proceed to step 416, where the one or more processors determine a location of the laser source from an intersection of the line of sight and the digital ground map. For example, processor 252 may determine that the laser source is emitted from location "33.94187 N, –118.40857 W." In some embodiments, the one or more processors may determine that the laser source is emitted from a location relative to the ground coordinate's local geography. For example, the one or more processors may determine that the laser source is emitted from a particular address or from a particular intersection. Method 400 may end at step 418.

Method 400 may include more or less steps than those illustrated in FIG. 4. For example, method 400 may further include determining, by the one or more processors, a wavelength of the laser light. As another example, method 400 may include determining, by the one or more processors, a time of the laser light detection. In some embodiments, method 400 includes communicating, by a data link, the determined location in real time.

Figure 5:
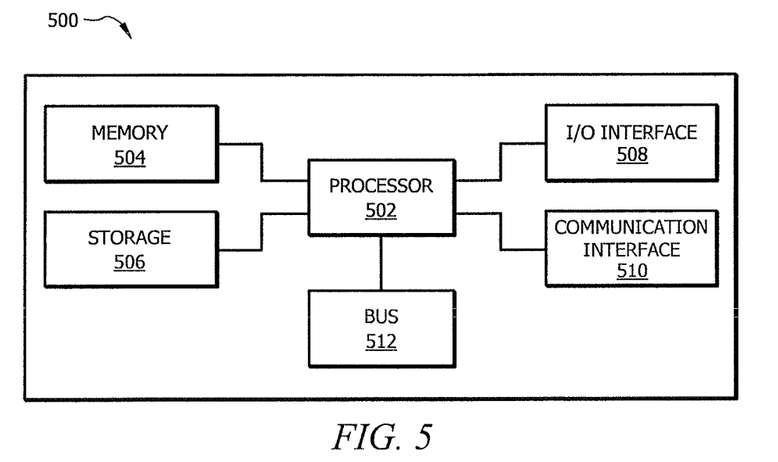
FIG. 5 illustrates a computer system that may be used by/as the computer systems of FIGS. 1 through 3, according to certain embodiments.

FIG. 5 illustrates a computer system 500 that may be utilized by aircraft laser detector 120 of FIGS. 2 and 3, according to certain embodiments. One or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502 (e.g., processor 252) a memory 504 (e.g., memory 254), storage 506, an input/output (I/O) interface 508 (e.g., interface 256), a communication interface 510 (e.g., interface 256), and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 (e.g., interface 256) includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 (e.g., interface 256) includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
    a laser detector operable to detect a laser light emitted from a laser source;
    a lens operable to pass the laser light to the laser detector;
    a Global Positioning System ("GPS") receiver operable to determine a GPS location of an aircraft;
    a digital ground map;
    a tilt measurement device operable to determine a tilt angle of the aircraft; and
    one or more processors operable to:
        determine a line of sight based on the detected laser light, the tilt angle, and the GPS location; and
        determine a location of the laser source from an intersection of the line of sight and the digital ground map;
    wherein the apparatus is a stand-alone, self-powered device.

2. The apparatus of claim 1, the one or more processors further operable to:
    determine a first angle of the laser light relative to the aircraft; and
    determine a second angle of the laser light relative to an Earth-fixed coordinate system by combining the first angle and the tilt angle, wherein the line of sight is further determined using the second angle.

3. The apparatus of claim 1, the one or more processors further operable to:
    determine a wavelength of the laser light; and
    determine a time of the laser light detection.

4. The apparatus of claim 1, further comprising a data link operable to communicate the determined location in real time.

5. The apparatus of claim 1, further comprising an attachment housing operable to attach the apparatus to an interior cockpit window of the aircraft.

6. The apparatus of claim 1, wherein the apparatus is less than 4 cubic inches in volume.

7. A system comprising:
    an apparatus comprising:
        a laser detector operable to detect a laser light emitted from a laser source;
        a lens operable to pass the laser light to the laser detector; and
        one or more processors operable to:
            access a digital ground map;
            access a Global Positioning System ("GPS") location of an aircraft from a GPS receiver;
            access a tilt angle of the aircraft from a tilt measurement device;
            determine a line of sight based on the laser light, the GPS location, and the tilt angle; and
            determine a location of the laser source from an intersection of the line of sight and the digital ground map;
    wherein the apparatus is a stand-alone, self-powered device.

8. The system of claim 7, wherein the digital ground map, the GPS receiver, and the tilt measurement device are independent of the system and are included in the aircraft's aviation system.

9. The system of claim 7, the one or more processors further operable to:
    determine a first angle of the laser light relative to the aircraft; and
    determine a second angle of the laser light relative to an Earth-fixed coordinate system by combining the first angle and the tilt angle, wherein the line of sight is further determined using the second angle.

10. The system of claim 7, the one or more processors further operable to:
    determine a wavelength of the laser light; and
    determine a time of the laser light detection.

11. The system of claim 7, further comprising a data link operable to communicate the determined location in real time.

12. The system of claim 7, further comprising an attachment housing operable to attach the apparatus to an interior cockpit window of the aircraft.

13. The system of claim 7, wherein the apparatus is less than 4 cubic inches in volume.

14. A method, comprising:
- passing, by a lens coupled to an aircraft, a laser light emitted from a laser source to a laser detector;
- detecting, by the laser detector, the laser light emitted from the laser source;
- accessing, by one or more processors, a digital ground map;
- accessing, by the one or more processors, a Global Positioning System ("GPS") location of the aircraft from a GPS receiver;
- accessing, by the one or more processors, a tilt angle of the aircraft from a tilt measurement device;
- determining, by the one or more processors, a line of sight based on the detected laser light, the GPS location, and the tilt angle; and
- determining, by the one or more processors, a location of the laser source from an intersection of the line of sight and the digital ground map;
- wherein the lens, the laser detector, the digital ground map, the GPS receiver, the tilt measurement device, and the one or more processors comprise a stand-alone, self-powered device.

15. The method of claim 14, further comprising:
- determining, by the one or more processors, a first angle of the laser light relative to the aircraft; and
- determining, by the one or more processors, a second angle of the laser light relative to an Earth-fixed coordinate system by combining the first angle and the tilt angle, wherein the line of sight is further determined using the second angle.

16. The method of claim 14, further comprising:
- determining, by the one or more processors, a wavelength of the laser light; and
- determining, by the one or more processors, a time of the laser light detection.

17. The method of claim 14, further comprising communicating, by a data link, the determined location in real time.

18. The method of claim 14, wherein the lens and the laser detector are coupled to an interior cockpit window of the aircraft.

* * * * *